United States Patent
Watson et al.

(10) Patent No.: US 10,084,810 B2
(45) Date of Patent: Sep. 25, 2018

(54) REMOTE WIPE OF AIRCRAFT DATA

(71) Applicant: Panasonic Avionics Corporation, Lake Forest, CA (US)

(72) Inventors: Philip Watson, Lake Forest, CA (US); Steven Bates, Mission Viejo, CA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 186 days.

(21) Appl. No.: 15/160,371

(22) Filed: May 20, 2016

(65) Prior Publication Data

US 2017/0339179 A1    Nov. 23, 2017

(51) Int. Cl.
  *H04L 29/06* (2006.01)
  *H04L 29/08* (2006.01)

(52) U.S. Cl.
  CPC ...... *H04L 63/1433* (2013.01); *H04L 63/0823* (2013.01); *H04L 63/1441* (2013.01); *H04L 67/12* (2013.01)

(58) Field of Classification Search
  CPC . H04L 63/1433; H04L 67/12; H04L 63/0823; H04L 63/1441
  See application file for complete search history.

(56) References Cited

U.S. PATENT DOCUMENTS

| | | | |
|---|---|---|---|
| 7,269,761 B2 | 9/2007 | Yi | |
| 9,223,796 B2 | 12/2015 | Lynch et al. | |
| 2002/0087885 A1 | 7/2002 | Paled et al. | |
| 2008/0086554 A1* | 4/2008 | Royalty | H04L 63/1408 709/224 |
| 2009/0170434 A1* | 7/2009 | Tengler | H04L 67/14 455/41.2 |
| 2010/0115092 A1 | 5/2010 | Westin | |
| 2010/0279675 A1 | 11/2010 | Slack et al. | |
| 2010/0318794 A1* | 12/2010 | Dierickx | B60R 25/04 713/164 |
| 2014/0292047 A1* | 10/2014 | Boyer, Jr. | B64D 11/06 297/217.4 |
| 2016/0149948 A1* | 5/2016 | Loomis | H04L 63/1441 726/23 |
| 2017/0244741 A1* | 8/2017 | Ferrer | H04L 63/1433 |

* cited by examiner

*Primary Examiner* — Don G Zhao
(74) *Attorney, Agent, or Firm* — Stetina Brunda Garred & Brucker

(57) ABSTRACT

In the selective wiping of data stored on an aircraft Inflight Entertainment and Communications (IFEC) computer system, a potential attack indicator generated in response to a detection of an attack attempt that is received from a remote manager client computer system. The potential attack indicator includes an attack severity classification, which is correlated to one of a plurality of attack attempt responses. Each of the attack attempt responses correspond to a data sensitivity classification, and each predefined block of data stored on the IFEC computer system is assigned a data sensitivity classification. According to the attack attempt response that was correlated to the received attack severity classification, the predefined blocks of data assigned to the data sensitivity classification corresponding to the attack attempt response are deleted.

20 Claims, 4 Drawing Sheets

REMOTE WIPE OF AIRCRAFT DATA

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to data security in computer systems on board aircraft, and more particularly, to remote wipe of aircraft data in response to attacks.

2. Related Art

Amongst the many advancements in aircraft technology, improvements in passenger comfort and convenience have received much attention. With air travel typically involving journeys that span at least a few hours in duration, if not longer, carriers have sought out various solutions for keeping passengers engaged. One of the most common, in part driven by the wide availability of computer systems capable of delivering a range of multimedia content, is an on-board in-flight entertainment (IFE) system. Typical IFE systems encompass the individual displays and input/output components such as multi-function remote controls and audio output jacks that are installed on the seatbacks, armrests, or other interior cabin structures for use by the passenger, along with the client terminal computer systems and related networking components. Additionally, IFE systems also encompass the central server computer system from which content data may be retrieved for individualized presentation/interaction.

Such content may include recently released movies, television shows such as news programs, situation and stand-up comedies, documentaries, and so on. Useful information about the destination such as airport disembarking procedures, immigration and custom procedures and the like are also frequently presented. Audio-only programming is also available, typically comprised of playlists of songs fitting into a common theme or genre. Likewise, video-only content such as flight progress mapping, flight status displays, and so forth are available. Many IFE systems also include video games that may be played by the passenger.

Although the availability of low-cost data storage has vastly increased the multimedia content selections offered via the IFE system, it is nevertheless limited because specific programming desired by any given passenger may not be loaded onto the server. Thus, passengers who have such specific content preferences may bring on board their own portable electronic devices (PEDs) such as smart phones, media players, electronic readers, tablets, laptop computers, and so forth, which can be loaded with the desired music, video, games, and other multimedia content of their choosing. This, too, is limited, particularly in comparison to the content that is available in the Internet.

With the ubiquity of Internet access on the ground, whether by way of cellular data connections, public WiFi networks, and so forth, passengers have become accustomed to ready access to the Internet, even during flight. In response to this demand, the carriers, aircraft manufacturers, and in-flight entertainment system providers alike have developed and deployed on-board Internet access solutions. Not only can the Internet access be utilized to retrieve multimedia entertainment content, the PEDs may be put to more productive uses that oftentimes require access to the Internet. For example, PEDs may have installed thereon various e-mail and instant messaging client applications, stock trading applications, banking applications, file sharing applications, cloud-based notetaking applications, and countless other productivity software. Furthermore, there may be dedicated applications that have functions that are particularly useful during travel, such as trip and connecting flight/departure gate tracking. Also popular are applications that are not necessarily productivity-related but still require Internet access, such as sports score updates, text-based news, and so forth. To a certain extent, these functionalities may be implemented in the IFE system as well.

In further detail, in-flight Internet access is provided via an onboard WiFi network, to which the PEDs and IFE terminal units connect. In this regard, there may be several WiFi access points located throughout the cabin, each of which are connected to a satellite uplink module that is in communication with a satellite. The satellite, in turn, may be in communication with a ground station that is connected to the Internet. The additional communications functionality thus provided warrant these systems to be referred to as in-flight entertainment and communications (IFEC) systems.

Although bandwidth of the satellite connection is limited as it is costly, a persistent connection may nevertheless be maintained so that paying customers may be provided with immediate access as desired. With such a persistent connection, the IFEC system effectively becomes another node on the Internet, and accordingly subject to various attacks. The firewall system that regulated outgoing Internet access to certain authorized nodes on the aircraft local area network may be configured to also monitor data traffic. There exists in the art intrusion detection systems and transmit live notifications to a ground control system. It is possible for such ground control systems to issue commands to the onboard IFEC system directed to disable or deactivate various system features that are under attack, or the system entirely.

Nevertheless, there remains the possibility that the attacker has obtained further access than has been reported. Various assets on the aircraft IFEC system may be at risk for theft, as well as breaking the encryption of sensitive files. Existing methods for responding to these attacks typically require a remote login, typically over Secure Shell (SSH) over the available Internet Protocol (IP) links, followed by manual entry of commands that are error-prone and subject to time delays.

There is accordingly a need in the art for an improved, automated modality of remotely erasing certain data on board IFEC systems, particularly under severe conditions or with highly valuable assets, as time to response is understood to be critical to reducing risk.

BRIEF SUMMARY

In one aspect, the present disclosure is directed to a secure application programming interface (API) to remotely wipe selected sensitive data that may be stored in an in-flight entertainment and communications (IFEC) system. Such data may include financial data and passenger data, as well as multimedia content including early movie releases and so forth. Depending on the severity of the attack, different response protocols may be implemented. This is contemplated to reduce the impact of intrusions into the IFEC system, and mitigate various costs, including security insurance, associated with such attacks. In another aspect, the disclosure is directed to a system for selectively wiping data stored on a vehicle entertainment system. The system includes a remote control interface in communication with a wide area network connection and receptive to a potential attack indicator from a client computer system on the vehicle storing different kinds of data. The system includes an attack classifier that assigns an attack severity classification based upon the potential attack indicator received by the remote control interface. An inventory of different kinds of data is maintained with each kind of data assigned a data sensitivity classification. A controller in communication with the attack classifier designates selected kinds of data to be deleted in accordance with an attack attempt response that correlates the data sensitivity classification of the kind of data to the attack severity classifications in the inventory. A data removal engine in communication with the controller and the client computer system on which the data is stored, performs deletion operations corresponding to the attack attempt response for the selected kinds of data.

According to one embodiment, there is an application interface to an IFEC computer system on board an aircraft for selectively wiping data stored thereon. The application interface may include a remote control interface in communication with a wide area network connection. The remote control interface may also be receptive to a potential attack indicator from a remote manager client computer system. There may be an attack classifier that assigns an attack severity classification based upon the potential attack indicator received by the remote control interface. There may also be a stored data cataloger, which assigns a tiered data sensitivity classification to the individual predefined blocks of data stored on the IFEC computer system. The stored data cataloger may also maintain an inventory of each predefined block of data associated with the tiered data sensitivity classification as a data inventory list. The application interface may also include a controller in communication with the attack classifier and the stored data cataloger. The controller may designate selected ones of the predefined blocks of data to be deleted in accordance with an attack attempt response that correlates the tiered data sensitivity classification of the predefined blocks of data to the attack severity classifications. There may also be a data removal engine in communication with the controller and a database of the IFEC computer system on which the predefined blocks of data are stored. The data removal engine may implement the deletion operations on the database as designated in the attack attempt response for the selected ones of the predefined blocks of data.

According to another embodiment of the present disclosure, there is a method for selectively wiping data stored on an IFEC computer system. The method may include receiving a potential attack indicator from a remote manager client computer system. The potential attack indicator may be generated in response to a detection of an attack attempt against the IFEC computer system. Additionally, the potential attack indicator may including an attack severity classification. The method may also include correlating, on the IFEC computer system, the attack severity classification to one of a plurality of attack attempt responses. Each of the attack attempt responses may correspond to a data sensitivity classification. Further, each predefined block of data stored on the IFEC computer system may being assigned a data sensitivity classification. There may additionally be a step of deleting, from the IFEC computer system according to the attack attempt response that was correlated to the received attack severity classification, the predefined blocks of data that are assigned the data sensitivity classification corresponding to the attack attempt response.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below in connection with the appended drawings is intended as a description of the several presently contemplated embodiments of an application interface for selectively wiping data stored on an aircraft in-flight entertainment and communications (IFEC) system. This description is not intended to represent the only form in which the embodiments of the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
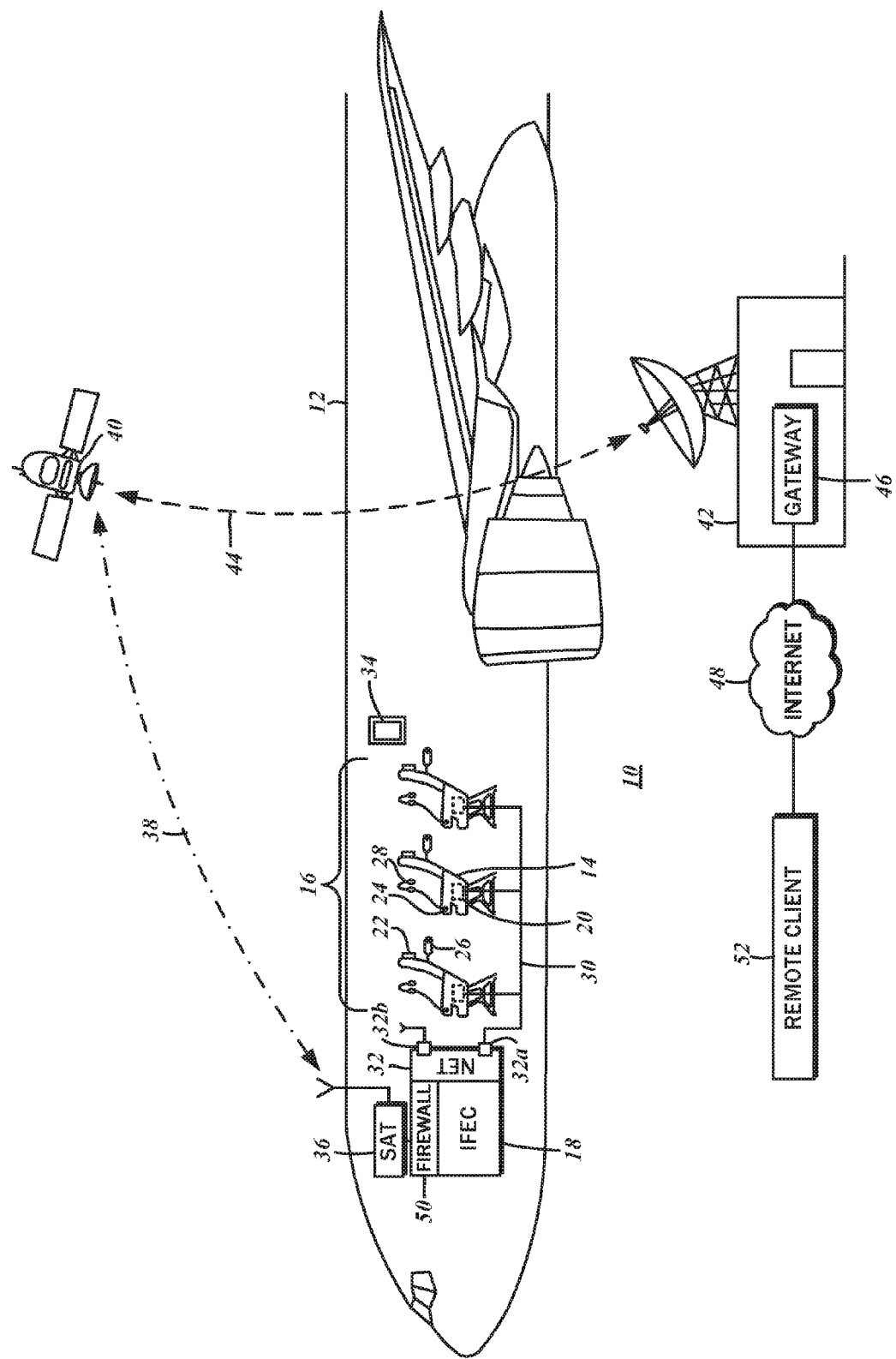
FIG. 1 is a diagram illustrating an environment in which the presently disclosed application interface to an in-flight entertainment and communication (IFEC) computer system on board an aircraft for selectively wiping data stored thereon.

FIG. 1 is a simplified diagram of an aircraft 10, generally referred to herein as a vehicle, along with select subsystems and components thereof that are utilized in connection with the embodiments of the present disclosure. Within a fuselage 12 of the aircraft 10, there may be seats 14 arranged over multiple rows 16, with each seat 14 accommodating a single passenger. Although the features of the present disclosure will be described in the context of the aircraft 10 this is by way of example only and not of limitation. The presently disclosed system for selectively wiping data may be utilized in any other context as appropriate, such as, by way of non-limiting illustrative example, the disclosed system may be used on busses, trains, ships, and other types of vehicles.

The aircraft 10 incorporates an in-flight entertainment and communications (IFEC) system 18, through which various entertainment and connectivity services may be provided to passengers while onboard. A typical IFEC system 18 include individual seat-back modules comprised of a terminal unit 20, a display 22, an audio output 24, and a remote controller 26. For a given row 16 of seats 14, the terminal unit 20 and the audio output 24 are disposed on the seat 14 for which it is provided, but the display 22 and the remote controller 26 may be disposed on the row 16 in front of the seat 14 to which it is provided. That is, the display 22 and the remote controller 26 are installed on the seatback of the row in front of the seat. This is by way of example only, and other display 22 and remote controller 26 mounting and access configurations such as a retractable arm or the like mounted to an armrest of the seat 14 or by mounting on a bulkhead.

The display 22 is understood to be a conventional liquid crystal display (LCD) screen or other type with a low profile that is suitable for installation on the seatback. Each passenger can utilize an individual headset 28, supplied by either the airline or by the passenger, which provides a more private listening experience. In the illustrated embodiment, the audio output 24 is a headphone jack that is a standard ring/tip/sleeve socket. The headphone jack may be disposed in proximity to the display 22 or on the armrest of the seat 14 as shown. The headphone jack may be an active type with noise canceling and including two or three sockets or a standard audio output without noise canceling. In alternate embodiments, each display 22 may incorporate a terminal unit 20 to form a display unit referred to in the art as a smart monitor.

A common use for the terminal unit 20 installed on the aircraft is the playback of various multimedia content. The terminal unit 20 may be implemented with a general-purpose data processor that decodes the data files corresponding to the multimedia content and generates video and audio signals for the display 22 and the audio output 24, respectively. The multimedia content data files may be stored in one or more repositories associated with the IFEC system 18, and each of the terminal units 20 for each seat 14 may be connected thereto over a wired local area network 30, which may preferably be Ethernet. The IFEC system 18 thus includes a data communications module 32, and more specifically, an Ethernet data communications module 32a, e.g., an Ethernet switch or router.

One or more passengers may utilize a portable electronic device (PED) 34 during flight. The present disclosure generally contemplates, in accordance with one embodiment, the use of such PEDs 34 in a manner to which the user is accustomed while on the ground, e.g., with data connectivity. For purposes of the present disclosure, PEDs 34 refer to smart phones, tablet computers, laptop computers, and other like devices that include a general purpose data processor that executes pre-programmed instructions to generate various outputs on a display, with inputs controlling the execution of the instructions. Although these devices are most often brought on board the aircraft 10 by the passengers themselves, carriers may also offer them to the passengers for temporary use.

Almost all conventional PEDs 34 have a WLAN (WiFi) module, so the data communications module 32 of the IFEC system 18 includes a WLAN access point 32b. The PED 34, via the onboard WLAN network, may connect to the IFEC system 18 to access various services offered thereon such as content downloading/viewing, shopping, and so forth.

The IFEC system 18 may also offer Internet access to the connecting terminal units 20 as well as the PEDs 34. One contemplated modality that operates with the IFEC system 18 is a satellite module 36 that establishes a data uplink 38 to a communications satellite 40. According to one exemplary embodiment, the data uplink 38 may be Ku-band microwave transmissions. However, any suitable communications satellite 40, such as Inmarsat or Iridium may also be utilized without departing from the present disclosure. The data transmitted to the communications satellite 40 is relayed to a satellite communications service provider 42. A data downlink 44 is established between the communications satellite 40 and the satellite communications service provider 42 that, in turn, includes a network gateway 46 with a connection to the Internet 48. In another embodiment, the aircraft 10 can be equipped with a cellular modem instead of, or in addition to the satellite module 36 for remote connectivity.

The terminal unit 20 or the PED 34 is understood to connect to the IFEC system 18 via the local area network established with the data communications module 32, which relays the data transmissions to the satellite module 36. The data is transmitted to the communications satellite 40 over the data uplink 38, and the communications satellite 40 relays the data to the satellite communications service provider 42 over the data downlink 44. The network gateway 46 then routes the transmission to the Internet 48. Due to the high costs associated with the communications satellite 40 that is passed to the users of the data uplink 38 and the data downlink 44, carriers may limit data traffic to and from the satellite module 36 with a firewall 50.

With the IFEC system 18 effectively being a node on the Internet 48, it is also possible for a remote client computer system 52 connected to the Internet 48 to reach and establish a communications session with the IFEC system 18. In some cases this may be desirable because many administrative tasks may be completed remotely without the aircraft being on the ground. While mission-critical avionics/flight control systems and the like are physically isolated from any computer node that may be capable of being accessed from an external network (whether it be the Internet 48 or otherwise), sensitive data may nevertheless be maintained by the IFEC system 18, such that unauthorized access by a malicious attacker can result in sensitive data being stolen.

Figure 2:
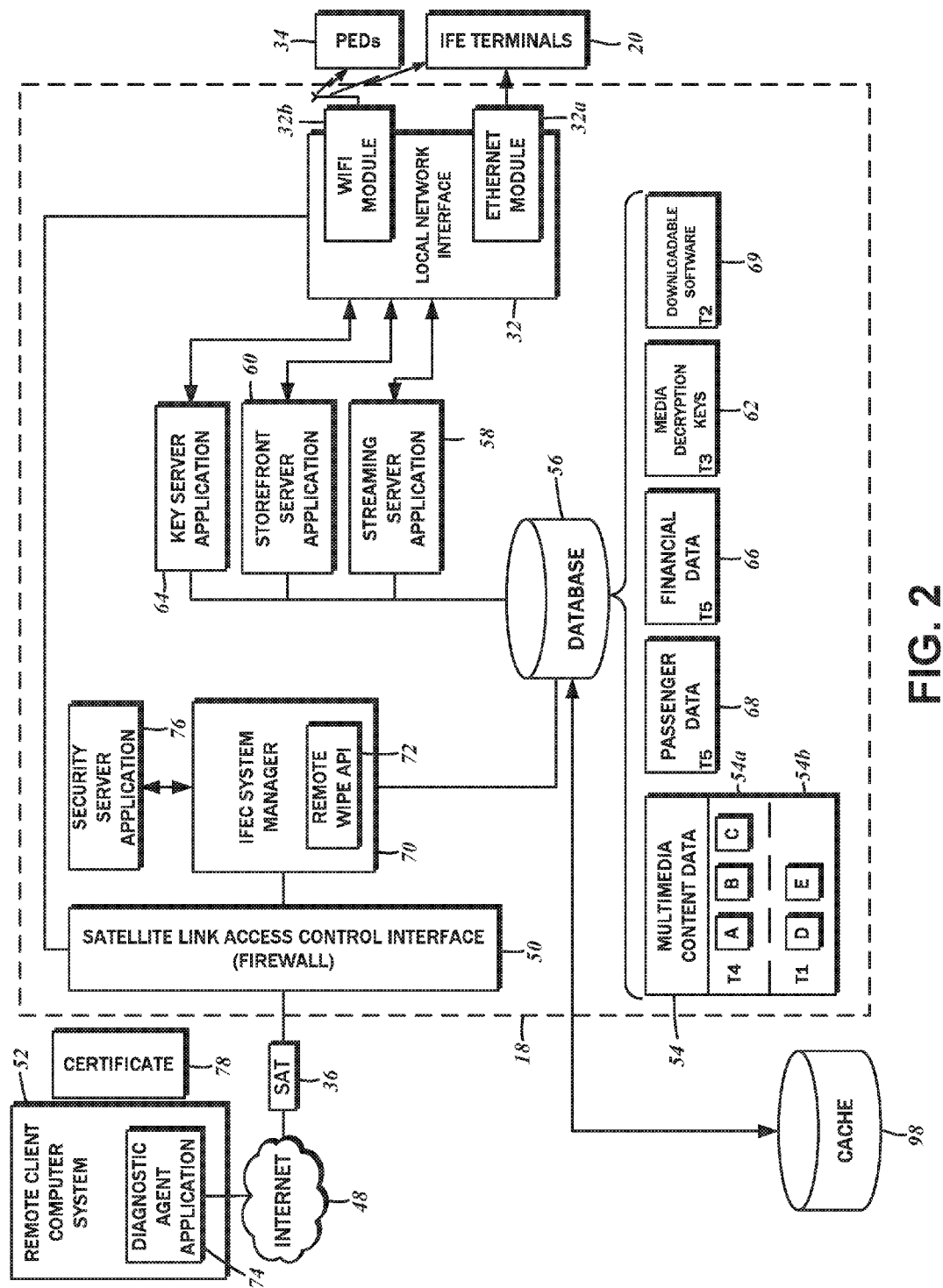
FIG. 2 is a block diagram of an exemplary IFEC computer system.

The application interface of the present disclosure is contemplated for remotely, selectively removing such sensitive data from the IFEC system 18 when an attack is detected. The block diagram of FIG. 2 illustrates additional details of the IFEC system 18, including the various components and submodules thereof. Again, the terminal units 20 and the PEDs 34 establish a local area network connection to the IFEC system 18 via a local network interface or data communications module 32. As indicated above, the local network interface includes an Ethernet data communications module 32a and a WLAN access point 32b. The local network interface or data communications module 32 is understood to encompass the hardware components such as the WiFi transceiver and the Ethernet router/switch, as well as the software drivers that interface the hardware components to the other software modules of the IFEC system 18.

One of the functions of the IFEC system 18 is to deliver multimedia content data 54 that is requested by the passenger via the terminal unit 20 or the PED 34. The multimedia content data 54 may include movies, television shows, music, and so forth, and may be stored in a database 56. The IFEC system 18 may include a streaming server application 58 that retrieves such multimedia content data 54 from the database 56 for transmission to the requestor. If the multimedia content data 54 is only viewable from the terminal units 20, the cataloging/menu applications with which the user interacts to select the desired multimedia content may be running on the terminal unit 20 itself without the need for additional server applications.

To the extent the same multimedia content data 54 is viewable by the PED 34, however, in addition to the streaming server application 58, there may also be a storefront server application 60 that generates the catalog of available multimedia content and accepts input selections from the passenger to initiate playback. Although the entire library of multimedia content stored in the database 56 may be provided free of charge to all passengers, some may be designated as premium content, and presented only in exchange for payment. In either case, access to the transmitted multimedia content data 54 should be limited to the passengers, it may be encrypted and locked.

In order to unlock and decrypt the multimedia content data 54, a digital certificate, which may also be referred to as a media decryption key 62, may be issued to the PED 34 following authentication and/or payment. Such key provisioning functionality may be implemented in a key server application 64. According to some embodiments, the number of media decryption keys 62 stored in the database 56 and available for use at any given time may be restricted. In the embodiments where payment is required before multimedia content may be viewed, the financial data 66 associated with the purchase transaction (including credit cards, contact information, and so on) is also stored in the database 56.

As noted above, aside from presenting entertainment content, the IFEC system 18 may be utilized to provide a wide variety of useful services such as connecting gate information, destination specific information, and the like. To facilitate these additional services, the IFEC system 18 may also maintain individual passenger data 68, and stored in the database 56. The software applications for these services may be controlled by an IFEC system manager 70. Some of these services are understood to be best delivered via dedicated software applications or "apps" installed on the PEDs 34. So that such apps may be retrieved without a connection to the Internet 48, such downloadable software 69 may be stored in the database 56.

The IFEC system manager 70 may additionally regulate incoming and outgoing data traffic from the devices connected to the local area network, e.g., the terminal units 20 and the PEDs 34, to the satellite module 36. In this regard, the IFEC system manager 70 may cooperate with a satellite link access control interface, also referred to as the firewall 50.

In a typical implementation, the firewall 50 is a conventional network appliance that includes a downstream network connection to the data communications module 32 that establishes the onboard local area network, as well as an upstream network connection to the satellite module 36. The firewall 50 may selectively block or permit specific devices connecting thereto via the onboard local area network from accessing the upstream network connection, e.g., the satellite module 36 depending on certain administratively defined conditions. For example, a rule/exception may be set for allowing traffic between a particular PED 34 that has paid a subscription fee, while restricting other PEDs 34 that have not subscribed. Furthermore, certain network node destinations may be blocked as inappropriate to access on a public network. These rules/exceptions may be activated for a set duration, such as, for example, when the user purchases an hour of access, access for the entirety of the flight, and so forth. Those having ordinary skill in the art will recognize that numerous other rules/exceptions for upstream data traffic may be set by defining such rules/exceptions in accordance with the syntax specific to the firewall 50. Although the syntax may differ depending on the specific implementation of the firewall 50, the logic of the rules/exceptions are understood to be applicable regardless of implementation. Therefore, to the extent such rules/exceptions are described in accordance with syntax specific to a given firewall 50, it is to be understood that this is by way of example only and not of limitation.

Other system administration functions may be provided by the IFEC system manager 70, including the contemplated application interface 72 for selectively wiping data. It is expressly contemplated that these system administration functions, including the function to delete certain data stored on the IFEC system 18, may be remotely invoked over the Internet 48 and the satellite link from a remote client computer system 52, and specifically a remote diagnostic agent application 74 running thereon.

Prior to gaining access to the IFEC system 18 and the IFEC system manager 70, the remote client computer system 52 may first be authenticated by a security server application 76. Generally, the remote client computer system 52 is understood to provide a digital certificate 78 that has been signed by a recognized certificate authority (CA). According to one embodiment, the security server application 76 may require that the certificate be signed by the manufacturer of the IFEC system 18. Once authenticated to be a legitimate access attempt, the security server application 76 may also encrypt all data traffic to and from the remote client computer system 52. While only the basic features of a public key encryption-based security system has been described, it will be appreciated by those having ordinary skill in the art that the security server application 76 includes other features that implement standard cryptographic communications protocols such as TLS/SSL.

The foregoing arrangement of the IFEC system 18, along with its constituent components, have been presented by way of example only and not of limitation. Those having ordinary skill in the art will recognize that the IFEC system 18 and its functional subparts can be arranged and organized in any number of different configurations. Furthermore, there may be additional components not mentioned herein, and certain functions may be handled by a different subpart or component than that to which the present disclosure attributes.

Figure 3:
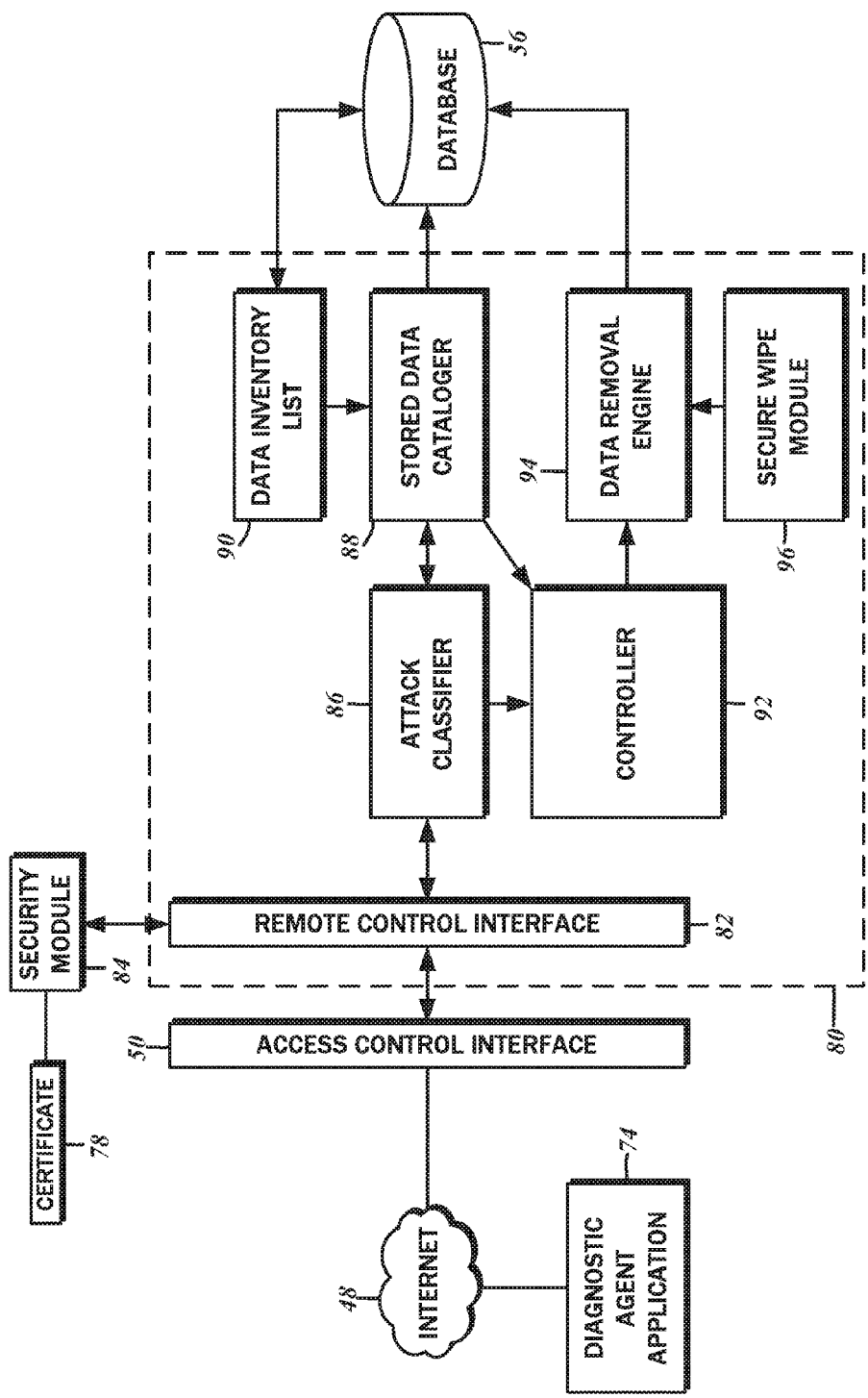
FIG. 3 is a block diagram of the application interface to the IFEC computer system in accordance with one embodiment of the present disclosure.

With reference now to the block diagram of FIG. 3, one embodiment of the present disclosure is an application interface 80, also referred to as an application programming interface (API) to remotely wipe selected sensitive data. As illustrated previously with reference to FIG. 2, the database 56 stores various data utilized in the IFEC system 18, including the multimedia content data 54, the media decryption keys 62, the financial data 66, the passenger data 68, and the downloadable software 69. It is to be understood that the database 56 refers generally to any repository of data, and need not be limited to databases constructed on a specialized relational database management system (DBMS) and its concomitant record structures.

Moreover, the database 56 need not refer to a single database, but may be comprised of multiple types of databases. For example, the multimedia content data 54 is typically stored as individual files, whereas the financial data 66 and the passenger data 68 may be stored in structured database records. It will be appreciated that such data may also be stored in structured files stored within a computer filesystem. Regardless of storage structure specifics, however, the aforementioned data to be stored in the database 56 may be characterized as a predefined blocks of data: in the case of the multimedia content data, one television show may be stored as a file making up the predefined blocks of data, whereas in the case of the financial data, a single record entry with a plurality of fields making up the account number, accountholder name, accountholder address, and so forth may likewise make up the predefined blocks of data.

The present disclosure contemplates a remotely initiated deletion of different predefined blocks of data depending on the severity of the attack. This is based upon the understanding that certain data is more sensitive than others, and justifies disparate treatment. In the case of the multimedia content data 54, there may be early releases of movies which have not yet been made available to the public on one end of the sensitivity spectrum, and there may be an old new program segment that little value on the other end. The financial data 66 and the passenger data 68 may also have a high level of sensitivity that would justify its immediate deletion in response to a possible security breach. Selective deletion of the data stored in the database 56, by definition, retains the data that can be retained with minimal risk if subject to improper disclosure.

The application interface 80 includes a remote control interface 82 that is in communication with a wide area network connection, e.g., the access control interface or firewall 50 to the satellite module 36, which in turn is connected to the Internet 48. The remote control interface 82 communicates with the remote diagnostic agent application 74 installed on a remote manager client computer system. The remote diagnostic agent application generates a potential attack indicator in response to a possible security breach in the IFEC system 18. The data in the potential attack indicator may be varied in accordance with the level of granularity and specificity desired to pinpoint possible attacks.

Before the potential attack indicator undergoes any further processing in the application interface 80, a perquisite condition is that the indicator was received over a secure data transmission link with an authenticated client. As described in more detail above, the IFEC system 18 includes a security server application 76 that initiates a secure TLS/SSL link with the remote client computer system 52. The application interface can therefore include a security module 84 that cooperates with the security server application 76 to validate the digital certificate 78 provided by the remote client computer system 52 to authenticate itself. Preferably, though optionally, the validation of the digital certificate 78 may include confirming the validity chain back to the root certificate of the manufacturer of the IFEC system 18. This measure, and other validation modalities, is understood to prevent abuse of the application interface 80 as another potential attack vector.

Figure 4:
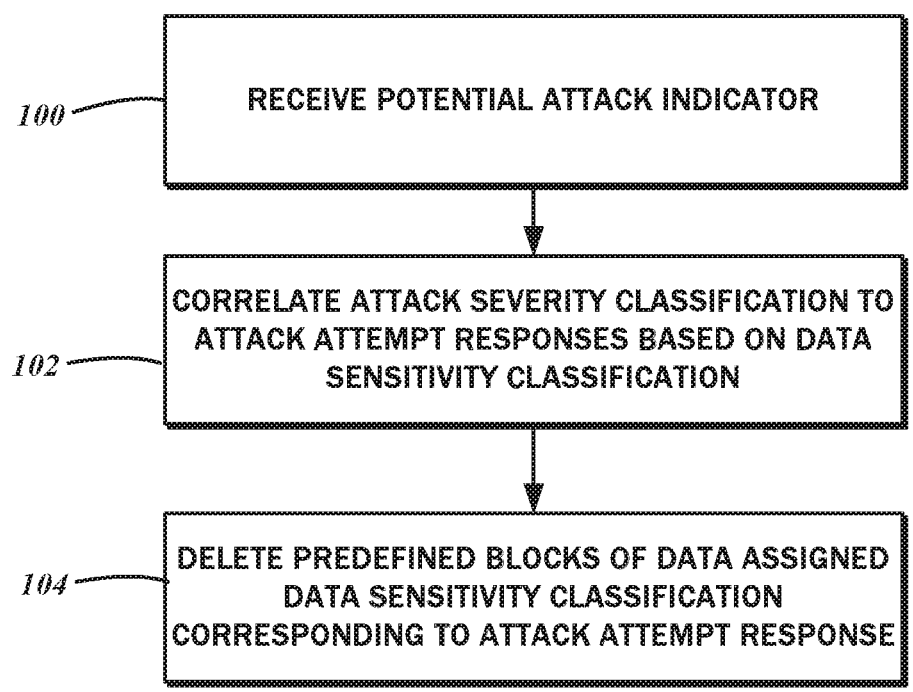
FIG. 4 is a flowchart describing one embodiment of a method for selectively wiping data stored on an IFEC computer system.

The present disclosure also contemplates a method for selectively wiping data stored on the IFEC system 18, the details of which are illustrated in the flowchart of FIG. 4. In accordance with a step 100, the received potential attack indicator is received by an attack classifier 86, which assigns an attack severity classification based thereon. In accordance with one embodiment of the present disclosure, the attack severity classification is defined as a numerical value within a tiered range of a plurality of values. In further detail, the attack severity classification may be some number between a range of one to five, with one being the least severe, and five being the most severe. That is, as the numerical value increases, the indicated severity level (and the warranted response) increases. Any suitable classification may be readily substituted without departing from the scope of the present disclosure.

The application interface 80 also includes a stored data cataloger 88 that cooperates with the database 56 to build a data inventory list 90 of the various predefined blocks of data stored therein. Additionally, the stored data cataloger 88b assigns a data sensitivity classification to each predefined block of data, and records such classification in the data inventory list 90. Like the attack severity classification, the data sensitivity classification is also understood to be a numerical value within a tiered range of a plurality of values. As shown in the example of FIG. 2, and along the lines of the previous examples set forth in connection with the attack severity classification, may be a number between a range of one to five. Specifically, the passenger data 68 and the financial data 66 may be assigned a data sensitivity classification of tier five (T5), a first subset of multimedia content data 54a may be assigned a data sensitivity classification of tier four (T4), the media decryption keys 62 may be assigned a data sensitivity classification of tier three (T3), the downloadable software 69 may be assigned a data sensitivity classification of tier four (T2), and the second subset of the multimedia content data 54b may be assigned a data sensitivity classification of tier five (T1). In this example, the more sensitive the data, the higher the tier classification. Furthermore, the data sensitivity classification is understood to correspond numerically to the attack severity classification, though this relationship is coincidental and exemplary only. The data sensitivity classification and the attack severity classification may have different ranges of values, or be based on a different unit altogether.

With the attack classification from the attack classifier 86, and the data sensitivity classification of the predefined blocks of data from the stored data cataloger 88, a controller 92, with which each of these components are in communication, designates selected ones of the predefined blocks of data for deletion. This deletion designation is understood to be in accordance with an attack attempt response that correlates the data sensitivity classification of the predefined blocks of data to the attack severity classification. Referring to the flowchart of FIG. 4, the method for selectively wiping data thus includes the step 102 of correlating the attack severity classification to the attack attempt responses. Each of the attack attempt responses is understood to correspond to the data sensitivity classification, and as mentioned above, each predefined block of data is assigned a data sensitivity classification.

Generally, the relationship between the data sensitivity classification and the attack severity classification is understood to be inverse, because the greater the sensitivity of data, the less severe an attack must be in order to justify deletion of the data. Continuing with the foregoing example, when an attack severity classification is one, then the predefined blocks of data associated with a tier five (T5) data sensitivity classification is designated for deletion.

As noted above, the attacks and the data blocks are classified along a tiered range. That is, if the attack severity classification is at one level, e.g., three, then the corresponding predefined blocks of data classified according to the highest data sensitivity classification down to the same data sensitivity classification are designated for deletion. In this example, tier five (T5), tier 4 (T4) and tier 3 (T3) data sensitivity classifications are designated for deletion.

Although an embodiment in which there is flexibility in the classification of the attack, the classification of data sensitivity, and the appropriate response has been described, a more rigid configuration is also contemplated. That is, the application interface 80 may include a plurality of function calls, with each different function call designating different predefined blocks of data stored on the database 56 for deletion. The remote diagnostic agent application 74 calls a specific function based upon the detected attack, and the application interface 80 merely applies the procedure which was called.

By way of example, one function may be pre-programmed with a procedure to delete or designate the deletion of the financial data 66 and the passenger data 68 upon invocation, while another function may be pre-programmed with a procedure to delete or designate the deletion of the first set of multimedia content data 54a. If the remote diagnostic agent application 74 detects an attack justifying a response of deleting the financial data 66 and the passenger data 68, then the first function is called. On the other hand, if the remote diagnostic agent application 74 detects an attack justifying the deletion of the first set of multimedia content data 54a, then the second function is called. When the remote diagnostic agent application 74 detects and attack that justifies the deletion of the financial data 66, the passenger data 68, and the first set of multimedia content data 54a, both the first function and the second function may be called.

The controller 92 passes the deletion designations to a data removal engine 94 for implementation thereby. In this regard, as shown in the flowchart of FIG. 4, the method for selectively wiping data continues with a step 104 of deleting the predefined blocks of data that are assigned a data sensitivity classifications corresponding to the attack attempt response, that is, indirectly, the attack severity classification.

In some embodiments, the data removal engine 94 marks those predefined blocks of data as being deleted and can be overwritten with additional data as executed by conventional computer systems. However, the data still remains within the database 56 and may be recovered using widely available software tools. To reduce the possibility of such recovery, there is a secure wipe module 96 that overwrites the predefined blocks of data in one or more passes. As will be recognized by those having ordinary skill in the art, the overwriting may be with a string of zeroes or ones, or with a random string of characters. Multiple passes may be employed to avoid the possibility of recovery by more sophisticated techniques of analyzing the physical storage devices of the database 56. Particularly with respect to the financial data 66, a secure wipe procedure may be necessary in order to comply with the Payment Card Industry Data Security Standard (PCI-DSS).

An attack response in which all downloadable software is deleted may be configured, and following the performance of such deletion operation. This effectively amounts to a "factory reset." Additionally referring back to the block diagram of FIG. 2, the controller 92 may direct the re-installation of such software from a cache 98 or archive database. This command may extend to all line replaceable units (LRUs) with downloadable software installed therein.

In addition to the deletion of data, individual applications may be locked and unlocked via the application interface 80. Instead of designating the predefined blocks of data for deletion, the controller 92 may designate which applications to lock and unlock in response to external commands tied to events such as payment status and the like.

The particulars shown herein are by way of example only for purposes of illustrative discussion, and are presented in the cause of providing what is believed to be the most useful and readily understood description of the principles and conceptual aspects of the various embodiments of the application interface for selectively wiping data set forth in the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. An application interface to an in-flight entertainment and communication (IFEC) computer system on board an aircraft for selectively wiping data stored thereon, the application interface comprising:
   a remote control interface in communication with a wide area network connection and receptive to a potential attack indicator from a remote client computer system;
   an attack classifier that assigns an attack severity classification based upon the potential attack indicator received by the remote control interface;
   a stored data cataloger including a catalog of individual predefined blocks of data stored on the IFEC computer system with each block assigned a data sensitivity classification, and an inventory of each predefined block of data associated with the data sensitivity classification being maintained as a data inventory list;
   a controller in communication with the attack classifier and the stored data cataloger, the controller designating selected ones of the predefined blocks of data to be deleted in accordance with an attack attempt response that correlates the data sensitivity classification of the predefined blocks of data to the attack severity classifications; and
   a data removal engine in communication with the controller and a database of the IFEC computer system on which the predefined blocks of data are stored, the data removal engine implementing the deletion operations on the database as designated in the attack attempt response for the selected ones of the predefined blocks of data.

2. The application interface of claim 1, further comprising a security module that validates the received potential attack indicator based upon an authentication certificate transmitted from the remote manager client computer system.

3. The application interface of claim 1, wherein the data removal engine includes a secure wipe module that overwrites the designated ones of the predefined blocks of data for deletion in one or more passes.

4. The application interface of claim 1, wherein:
   the attack severity classification is defined as a numerical value within a tiered range of a plurality of values; and
   the data sensitivity classification is defined as a numerical value within a tiered range of plurality of values.

5. The application interface of claim 4, wherein the attack severity classification is related to the data sensitivity classification.

6. The application interface of claim 4, wherein the attack attempt response correlated to a first attack severity classification includes the attack attempt response correlated to a second attack severity classification that is of a higher tier than the first attack severity classification.

7. The application interface of claim 1, wherein at least one of the predefined blocks of data is a multimedia content file.

8. The application interface of claim 1, wherein at least one of the predefined blocks of data is a database record entry.

9. A method for selectively wiping data stored on an in-flight entertainment and communications (IFEC) computer system, the method comprising:
   receiving a potential attack indicator from a remote manager client computer system, the potential attack indicator being generated in response to a detection of an attack attempt against the IFEC computer system and including an attack severity classification;

correlating, on the IFEC computer system, the attack severity classification to one of a plurality of attack attempt responses each corresponding to a data sensitivity classification, each of a plurality of predefined blocks of data stored on the IFEC computer system being assigned one of the data sensitivity classifications; and deleting, from the IFEC computer system according to the attack attempt response that was correlated to the received attack severity classification, the predefined blocks of data that are assigned the data sensitivity classification corresponding to the attack attempt response.

10. The method of claim 9, wherein prior to deleting the predefined blocks of data that are assigned the data sensitivity classification corresponding to the attack attempt response, an access request from the remote manager client computer system to the IFEC computer system is validated with a digital certificate provided by the remote manager client computer system.

11. The method of claim 9, wherein the step of deleting the predefined blocks of data includes overwriting the predefined blocks of data one or more times.

12. The method of claim 9, wherein:
the attack severity classification is defined as a numerical value within a range of a plurality of tiered values; and
the data sensitivity classification is defined as a numerical value within a range of plurality of tiered values.

13. The method of claim 12, wherein the attack severity classification is related to the data sensitivity classification.

14. The method of claim 12, wherein the attack attempt response correlated to a first attack severity classification includes the attack attempt response correlated to a second attack severity classification that is of a higher tier than the first attack severity classification.

15. A system for selectively wiping data stored on a vehicle entertainment system, the system comprising:

a remote control interface in communication with a wide area network connection and receptive to a potential attack indicator from a client computer system on the vehicle storing different kinds of data;

an attack classifier that assigns an attack severity classification based upon the potential attack indicator received by the remote control interface;

an inventory of the different kinds of data with each kind of data assigned a data sensitivity classification;

a controller in communication with the attack classifier designates selected kinds of data to be deleted in accordance with an attack attempt response that correlates the data sensitivity classification of the kind of data to the attack severity classifications based on the inventory; and a data removal engine in communication with the controller and the client computer system in which the data removal engine performs deletion operations corresponding to the attack attempt response for the selected ones kinds of data.

16. The system of claim 15, further comprising a security module that validates the received potential attack indicator based upon an authentication certificate transmitted from the client computer system.

17. The system of claim 15, wherein the data removal engine includes a secure wipe module that overwrites data for deletion in one or more passes.

18. The system of claim 15, wherein:
the attack severity classification is defined as a numerical value within a tiered range of a plurality of values; and
the data sensitivity classification is defined as a numerical value within a tiered range of plurality of values.

19. The system of claim 15, wherein the attack severity classification is related to the data sensitivity classification.

20. The system of claim 15, where the different kinds of data include at least multimedia content data and financial data.

* * * * *